(12) United States Patent
Ogawa

(10) Patent No.: US 11,586,398 B2
(45) Date of Patent: Feb. 21, 2023

(54) INFORMATION PROCESSING APPARATUS THAT DISPLAYS A LIST OF IMAGE OUTPUT APPARATUSES BASED ON STATUS INFORMATION CONCERNING FUNCTIONALITY AND COMMUNICATION STATE, INFORMATION PROCESSING METHOD, AND NON-TRANSITORY COMPUTER-READABLE STORAGE MEDIUM STORING PROGRAM

(71) Applicant: Canon Kabushiki Kaisha, Tokyo (JP)

(72) Inventor: Nobuhiro Ogawa, Chiba (JP)

(73) Assignee: Canon Kabushiki Kaisha, Tokyo (JP)

(\*) Notice: Subject to any disclaimer, the term of this patent is extended or adjusted under 35 U.S.C. 154(b) by 69 days.

(21) Appl. No.: 17/218,419

(22) Filed: Mar. 31, 2021

(65) Prior Publication Data
US 2021/0303219 A1 Sep. 30, 2021

(30) Foreign Application Priority Data
Mar. 31, 2020 (JP) .............................. JP2020-064197

(51) Int. Cl.
*G06F 3/12* (2006.01)
(52) U.S. Cl.
CPC ............ *G06F 3/121* (2013.01); *G06F 3/1204* (2013.01); *G06F 3/1259* (2013.01); *G06F 3/1274* (2013.01)
(58) Field of Classification Search
None
See application file for complete search history.

(56) References Cited

U.S. PATENT DOCUMENTS

| 7,495,790 B2 | 2/2009 | Oono |
| 2003/0053106 A1* | 3/2003 | Kuroda ................. G06F 3/1203 358/1.13 |
| 2005/0206938 A1* | 9/2005 | Oono ..................... G06F 3/1225 358/1.15 |

FOREIGN PATENT DOCUMENTS

JP 2005267544 9/2005

\* cited by examiner

*Primary Examiner* — Lennin R RodriguezGonzalez
(74) *Attorney, Agent, or Firm* — Venable LLP

(57) ABSTRACT

An information processing apparatus communicable with an image output apparatus, comprises: a storage unit configured to store first status information concerning whether it is possible to execute a function in the image output apparatus, which is acquired from the image output apparatus; and a display unit configured to display a list of image output apparatuses as management targets based on the first status information stored in the storage unit and second status information concerning a communication state between the information processing apparatus and the image output apparatus. If a condition based on the first status information and the second status information is satisfied, the display unit displays, as a candidate to be deleted from the management targets, an image output apparatus corresponding to the first status information and the second status information.

15 Claims, 13 Drawing Sheets

| | 500 | 501 | 502 | 503 | 504 | 505 | 506 | 507 |
|---|---|---|---|---|---|---|---|---|
| | MANAGEMENT ID | DEVICE NAME | CONNECTION DESTINATION | MAC ADDRESS | PRODUCT NAME | INSTALLATION PLACE | STATUS | FINAL STATUS |
| | ID-A | Printer-A | xxx.xxx.xxx.xxx | xx:xx:xx:xx:xx:xx | Poster-1 | STORE A | INCOMMUNICABLE WITH PRINTER | NO INK |
| | ID-B | Printer-B | xxx.xxx.xxx.xxx | xx:xx:xx:xx:xx:xx | Poster-1 | STORE A | NORMAL | NORMAL |
| | ID-C | Printer-C | xxx.xxx.xxx.xxx | xx:xx:xx:xx:xx:xx | CAD-2 | STORE A | INCOMMUNICABLE WITH PRINTER | NORMAL |
| | ID-D | Printer-D | xxx.xxx.xxx.xxx | xx:xx:xx:xx:xx:xx | Poster-1 | STORE B | NO PAPER | NO PAPER |
| | ID-E | Printer-E | xxx.xxx.xxx.xxx | xx:xx:xx:xx:xx:xx | CAD-2 | STORE B | NO INK | NO INK |
| | ID-F | Printer-F | xxx.xxx.xxx.xxx | xx:xx:xx:xx:xx:xx | CAD-2 | STORE B | INCOMMUNICABLE WITH PRINTER | PRINTER TROUBLE HAS OCCURRED |

F I G. 5

| MANAGEMENT ID 500 | DEVICE NAME 501 | CONNECTION DESTINATION 502 | MAC ADDRESS 503 | PRODUCT NAME 504 | INSTALLATION PLACE 505 | STATUS 506 | FINAL STATUS 507 |
|---|---|---|---|---|---|---|---|
| ID-A | Printer-A | xxx.xxx.xxx.xxx | xx:xx:xx:xx:xx:xx | Poster-1 | STORE A | INCOMMUNICABLE WITH PRINTER | NO INK |
| ID-B | Printer-B | xxx.xxx.xxx.xxx | xx:xx:xx:xx:xx:xx | Poster-1 | STORE A | NORMAL | NORMAL |
| ID-C | Printer-C | xxx.xxx.xxx.xxx | xx:xx:xx:xx:xx:xx | CAD-2 | STORE A | INCOMMUNICABLE WITH PRINTER | NORMAL |
| ID-D | Printer-D | xxx.xxx.xxx.xxx | xx:xx:xx:xx:xx:xx | Poster-1 | STORE B | NO PAPER | NO PAPER |
| ID-E | Printer-E | xxx.xxx.xxx.xxx | xx:xx:xx:xx:xx:xx | CAD-2 | STORE B | NO INK | NO INK |
| ID-F | Printer-F | xxx.xxx.xxx.xxx | xx:xx:xx:xx:xx:xx | CAD-2 | STORE B | INCOMMUNICABLE WITH PRINTER | PRINTER TROUBLE HAS OCCURRED |

FIG. 6

DEVICE MANAGEMENT SYSTEM

STATE OF PRINTER

| PRINTER NAME | CONNECTION DESTINATION | STATUS | MAC ADDRESS | PRODUCT NAME | INSTALLATION PLACE |
|---|---|---|---|---|---|
| Printer-A | xxx.xxx.xxx.xxx | PREDICTED AS NON-MANAGEMENT TARGET | xx:xx:xx:xx:xx:xx | Poster-1 | STORE A |
| Printer-B | xxx.xxx.xxx.xxx | NORMAL | xx:xx:xx:xx:xx:xx | Poster-1 | STORE A |
| Printer-C | xxx.xxx.xxx.xxx | INCOMMUNICABLE WITH PRINTER | xx:xx:xx:xx:xx:xx | CAD-2 | STORE A |
| Printer-D | xxx.xxx.xxx.xxx | NORMAL | xx:xx:xx:xx:xx:xx | Poster-1 | STORE B |
| Printer-E | xxx.xxx.xxx.xxx | NO INK | xx:xx:xx:xx:xx:xx | CAD-2 | STORE B |
| Printer-F | xxx.xxx.xxx.xxx | PREDICTED AS NON-MANAGEMENT TARGET | xx:xx:xx:xx:xx:xx | CAD-2 | STORE B |

UPDATE

FIG. 9

DELETION TARGET DEVICE MANAGEMENT SCREEN

BASE : STORE A

| | PRINTER NAME | CONNECTION DESTINATION | MAC ADDRESS | PRODUCT NAME |
|---|---|---|---|---|
| ✓ | Printer-A | xxx.xxx.xxx | xx:xx:xx:xx:xx | Poster-1 |

BASE : STORE B

| | PRINTER NAME | CONNECTION DESTINATION | MAC ADDRESS | PRODUCT NAME |
|---|---|---|---|---|
| | Printer-F | xxx.xxx.xxx | xx:xx:xx:xx:xx | CAD-2 |

[ DELETE ]   [ CANCEL ]

FIG. 12

| CONDITION ID | ITEM OF DEVICE MANAGEMENT INFORMATION | VALUE OF DEVICE MANAGEMENT INFORMATION |
|---|---|---|
| ID-α | PRODUCT NAME | Poster-1 |
| ID-β | INSTALLATION PLACE | STORE A |

INFORMATION PROCESSING APPARATUS THAT DISPLAYS A LIST OF IMAGE OUTPUT APPARATUSES BASED ON STATUS INFORMATION CONCERNING FUNCTIONALITY AND COMMUNICATION STATE, INFORMATION PROCESSING METHOD, AND NON-TRANSITORY COMPUTER-READABLE STORAGE MEDIUM STORING PROGRAM

BACKGROUND OF THE INVENTION

Field of the Invention

The present invention relates to an information processing apparatus for managing an image output apparatus, an information processing method, and a non-transitory computer-readable storage medium storing a program.

Description of the Related Art

There is provided software having a management function of connecting an image output apparatus such as a printer and an information processing apparatus such as a PC by a network and managing the state of the image output apparatus from the information processing apparatus via the network. By using such software, a user can grasp the state of the image output apparatus from a remote site. In addition, by registering, in the information processing apparatus, information necessary to identify the image output apparatus, it is possible to search for the specific image output apparatus existing on the network, acquire information concerning the latest state from the image output apparatus, and display it. On the other hand, with respect to an image output apparatus that is not used any more due to disposal, a failure, or replacement, the image output apparatus can be excluded from the management target by deleting the registered information from the information processing apparatus.

Japanese Patent Laid-Open No. 2005-267544 describes that an image output apparatus whose registered information is to be deleted is decided from image output apparatuses as management targets in accordance with conditions such as the use status of the image output apparatus, for example, "use frequency" or "last use date/time".

SUMMARY OF THE INVENTION

The present invention provides an information processing apparatus that appropriately deletes an image output apparatus from the management target, an information processing method, and a non-transitory computer-readable storage medium storing a program.

The present invention in one aspect provides an information processing apparatus communicable with an image output apparatus, comprising: a storage unit configured to store first status information concerning whether it is possible to execute a function in the image output apparatus, which is acquired from the image output apparatus; and a display unit configured to display a list of image output apparatuses as management targets based on the first status information stored in the storage unit and second status information concerning a communication state between the information processing apparatus and the image output apparatus, wherein if a condition based on the first status information and the second status information is satisfied, the display unit displays, as a candidate to be deleted from the management targets, an image output apparatus corresponding to the first status information and the second status information.

According to the present invention, it is possible to appropriately delete an image output apparatus from the management target.

Further features of the present invention will become apparent from the following description of exemplary embodiments with reference to the attached drawings.

BRIEF DESCRIPTION OF THE DRAWINGS

FIG. 5 is a table showing device management information;
FIG. 6 is a view showing a device management screen:
FIG. 9 is a view showing a deletion target device display screen:
FIG. 12 is a table showing definition information.

DESCRIPTION OF THE EMBODIMENTS

Figure 1:
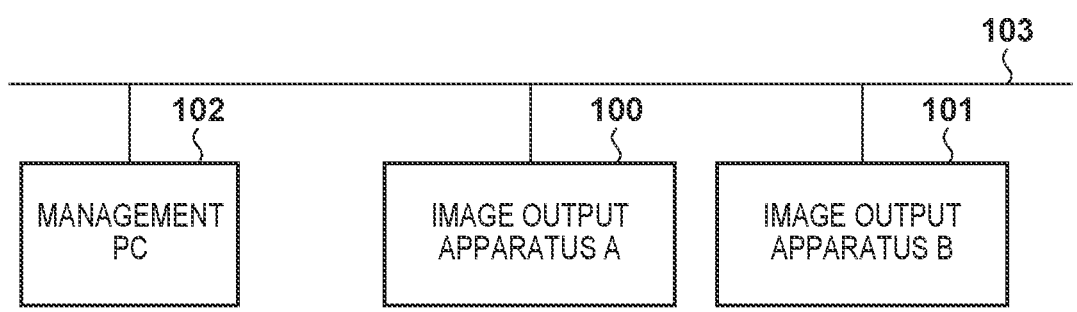
FIG. 1 is a block diagram showing a system configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

According to Japanese Patent Laid-Open No. 2005-267544, among image output apparatuses as management targets of an information processing apparatus, an image output apparatus whose use frequency is low may become a deletion target although it is originally not the deletion target.

According to one aspect of the present invention, it is possible to appropriately delete an image output apparatus from the management target.

First Embodiment

An information processing system according to this embodiment is a state management system that manages the states of a plurality of image output apparatuses. In each image output apparatus, a state such as a normal state, a printing state, or a consumable remaining amount warning/ error state that can occur in a normal operation or a state such as a service call or an operator call in which a failure is suspected is stored as state information. The state information is updated at a predetermined frequency for each image output apparatus. In the state management system, each image output apparatus as the management target is managed via a network based on the state information acquired from the image output apparatus.

FIG. 1 is a block diagram showing an example of the configuration of the state management system. As shown in FIG. 1, a management PC 102 is communicably connected to image output apparatuses 100 and 101 via a network 103. The network 103 is a network including wired connection, wireless connection, or both of them. The management PC 102 acquires the state information stored in each of the image output apparatuses 100 and 101. Note that this embodiment will explain a case in which two image output apparatuses are provided but the number of image output apparatuses is not limited to this and may be one or three or more. This embodiment will describe a case in which one management PC 102 is provided. However, the management PC 102 formed by a plurality of apparatuses may implement the operation of this embodiment. Each of the image output apparatuses 100 and 101 is a printing apparatus that can print on various types of printing paper by the inkjet printing method or the like.

Figure 2:
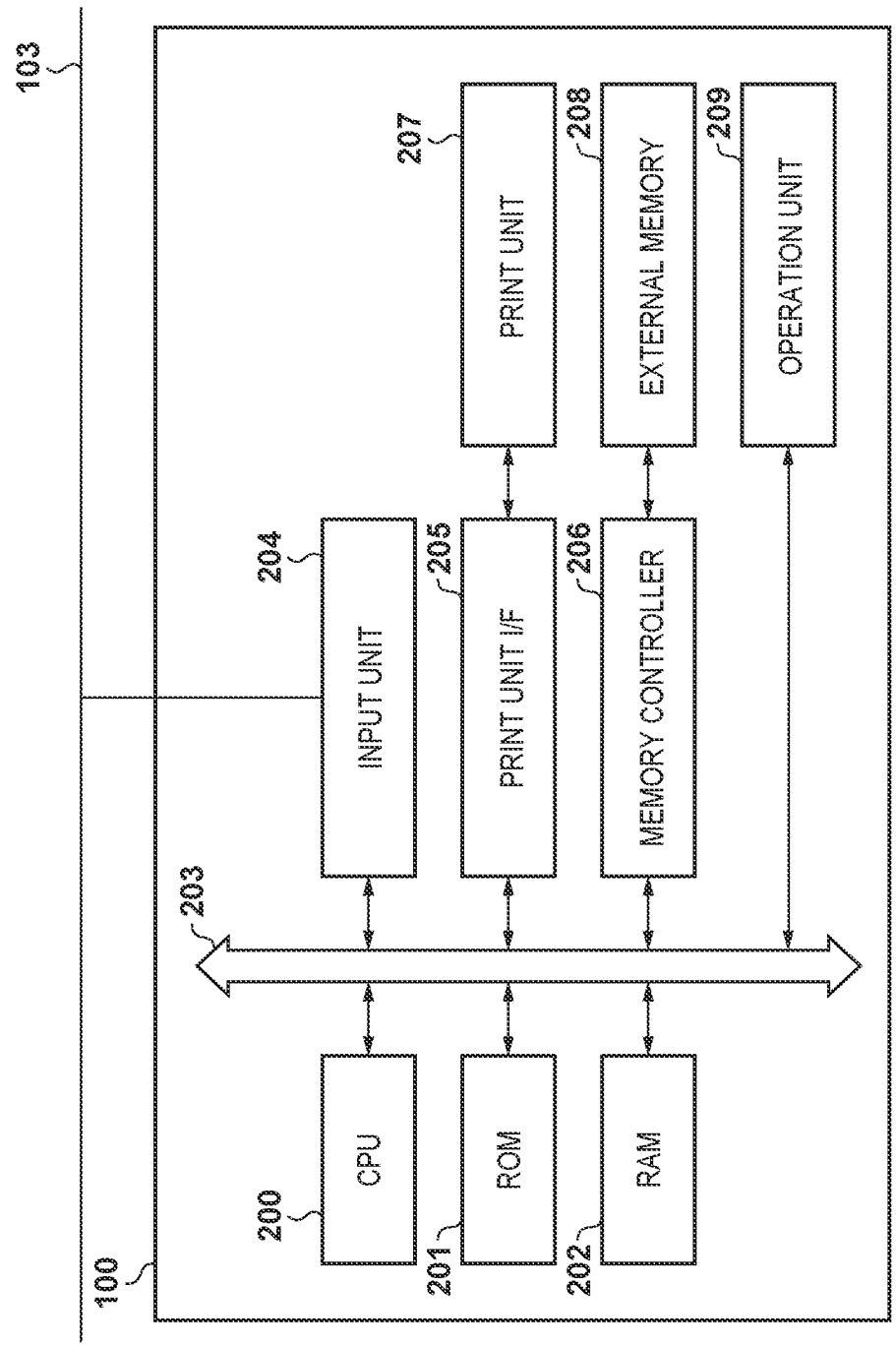
FIG. 2 is a block diagram showing the hardware arrangement of an image output apparatus.

FIG. 2 is a block diagram showing an example of the hardware arrangement of each of the image output apparatuses 100 and 101. In this embodiment, the image output apparatus 100 will be described as a representative example of the image output apparatuses 100 and 101. In FIG. 2, the image output apparatus 101 has the same arrangement as that of the image output apparatus 100 and a description thereof will be omitted. A CPU 200 comprehensively controls the image output apparatus 100 by controlling respective units via a main bus 203. The operation of the image output apparatus 100 according to this embodiment is implemented when, for example, the CPU 200 reads out a control program and the like stored in a program ROM of a ROM 201 or a control program and the like stored in an external memory 208 into a RAM 202 and executes them. For example, at the time of executing a print function, the CPU 200 receives, via an input unit 204 across the network 103, output data (for example, image data as the print target) to be output to a print unit 207. Then, the CPU 200 outputs, via the main bus 203, an image signal to the print unit (printer engine) 207 connected to a print unit interface (I/F) 205. Furthermore, the CPU 200 can communicate with the management PC 102 via the input unit 204, and transmits information in the image output apparatus 100 to the management PC 102 periodically or in response to a request from the management PC. In this embodiment, device information (to be described later) including the state information is transmitted to the management PC 102.

The RAM 202 is a RAM functioning as the main memory, the work area, or the like of the CPU 200, and is configured to increase the memory capacity by an optional RAM connected to an expansion port (not shown). Note that the RAM 202 is used as, for example, an output information deployment area and an environment data storage area. The external memory 208 such as a hard disk (HDD) or an IC card is connected to the main bus 203 via a memory controller 206, and the memory controller 206 executes access control to the external memory 208. The external memory 208 is optionally connected, and stores font data, an emulation program, form data, information concerning paper registered in the image output apparatus 100, paper attribute information, and the like. An operation unit 209 includes, for example, a panel as a display unit, and displays a user interface screen or the like for accepting an instruction, settings, and the like from the user. The operation unit 209 also includes, for example, hard keys as an acceptance unit that accepts an operation such as an instruction or setting operation from the user.

Figure 3:
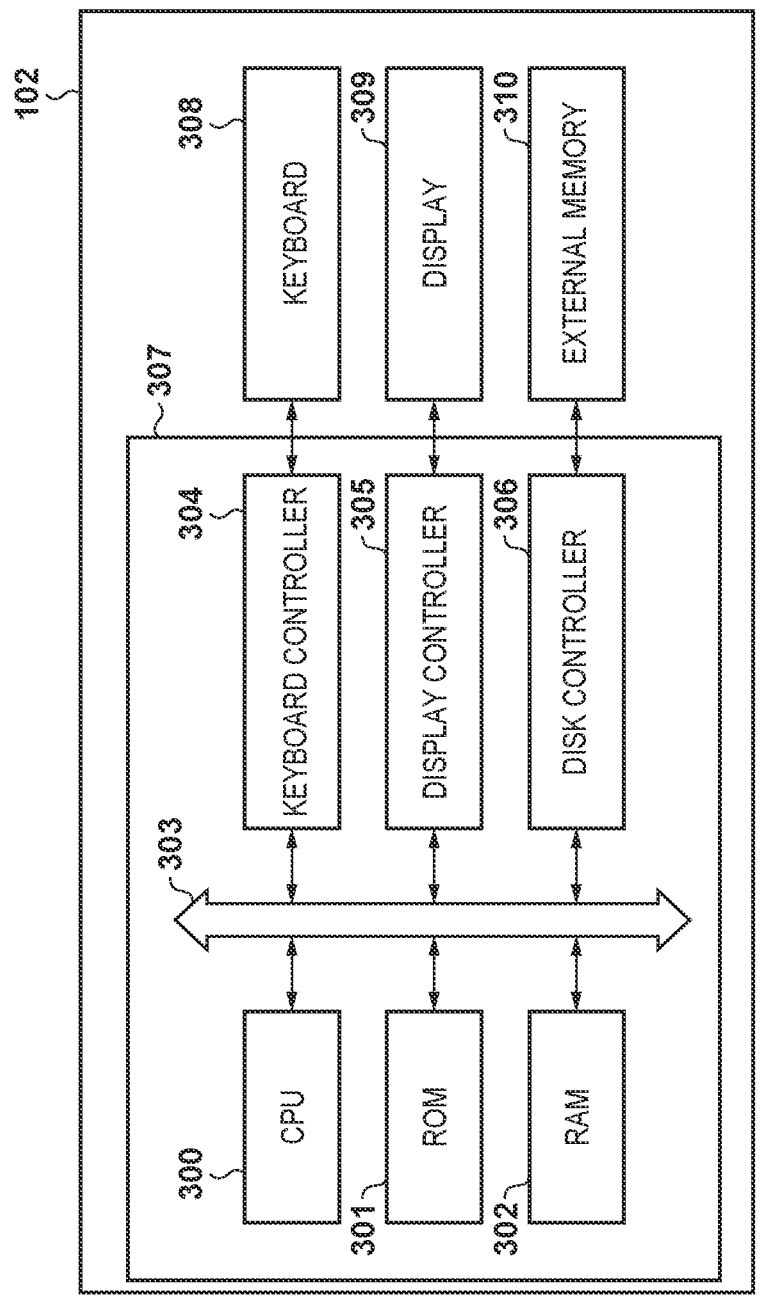
FIG. 3 is a block diagram showing the hardware arrangement of a management PC.

FIG. 3 is a block diagram showing an example of the arrangement of the management PC 102. A main body 307 includes a CPU 300, a ROM 301, a RAM 302, a keyboard controller 304, a display controller 305, and a disk controller 306. The CPU 300 comprehensively controls the management PC 102 by controlling respective units via a main bus 303. The CPU 300 is a dedicated circuit such as an ASIC. The operation of the management PC 102 according to this embodiment is implemented when, for example, the CPU 300 reads out various programs such as a control program, a system program, and an application program from an external memory 310 into the RAM 302 via the disk controller 306, and executes them. The CPU 300 may read out a control program and the like from the ROM 301. For example, the CPU 300 performs various kinds of data processes and display control of a display 309 by executing the various programs read out into the RAM 302. In this embodiment, the CPU 300 acquires the device information from the image output apparatus 100, and stores it as device management information in an internal storage area.

The disk controller 306 controls access to the external memory 310 such as an FD, HD, CD-ROM, DVD-ROM, MD, or MO. The RAM 302 is configured to increase its capacity by an optional RAM (not shown), and is mainly used as the work area of the CPU 300. The keyboard controller 304 controls key input from a keyboard 308 or a pointing device (not shown). The display controller 305 controls display of the display 309 as a display unit.

Figure 4:
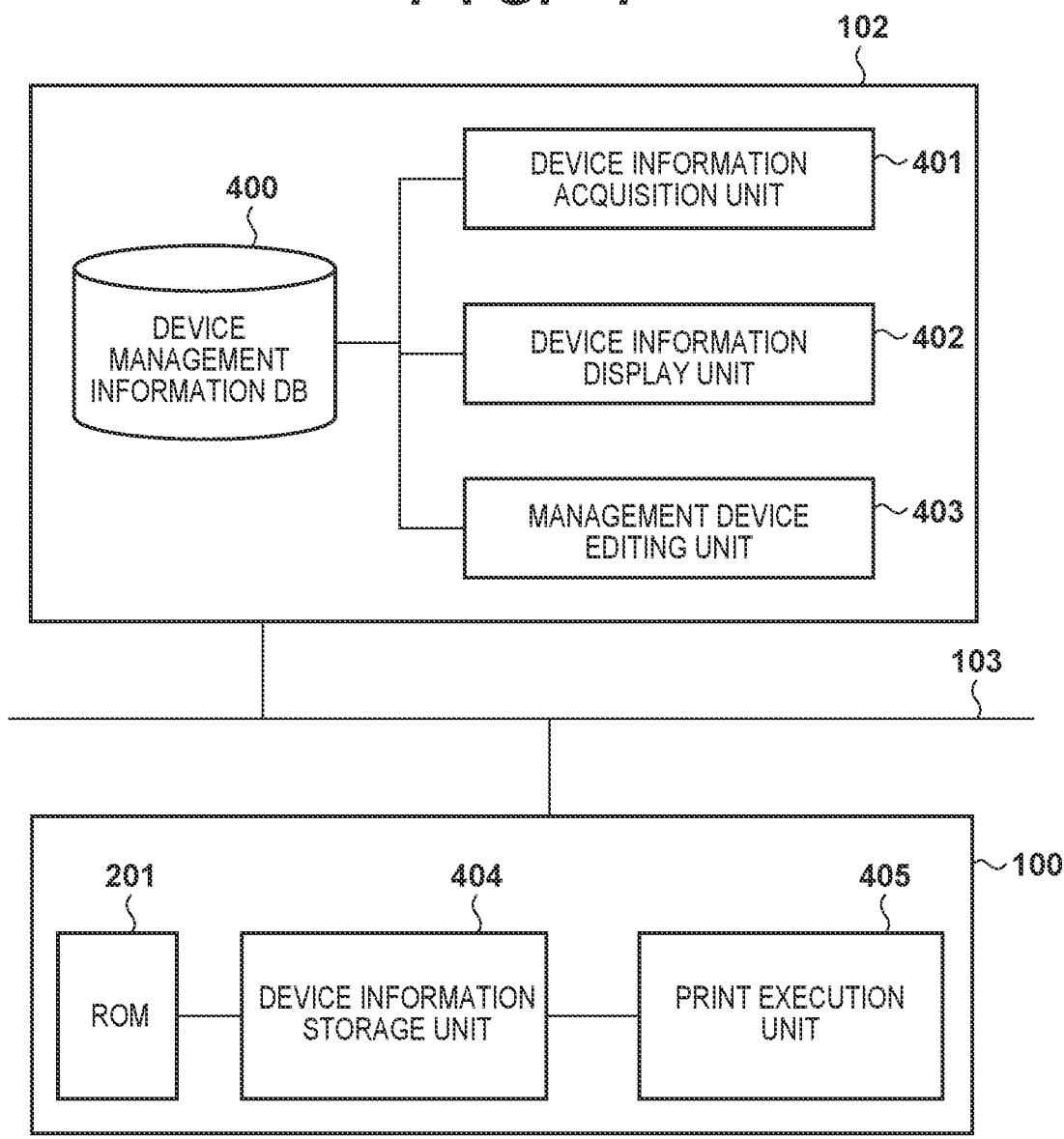
FIG. 4 is a block diagram showing the arrangement of functional blocks in a system.

FIG. 4 is a block diagram showing an example of the arrangement of functional blocks in the image output apparatus 100 or 101 and the management PC 102. The functional blocks in the image output apparatus 100 will first be described. Note that the image output apparatus 101 is the same as the image output apparatus 100 and a description thereof will be omitted. A device information storage unit 404 is configured in the ROM 201 to store, as device information concerning the image output apparatus 100, a device name, connection destination information, a MAC address, a product name, an installation place (base information), and state information. As the state information, a state such as a normal state, a printing state, or a consumable remaining amount warning/error state that can occur in a normal operation or a state such as a service call or an operator call in which a failure is suspected is stored. A print execution unit 405 is a functional block implemented by the CPU 200, and updates the state information in the device information storage unit 404 when executing printing in the print unit 207. For example, the print execution unit 405 sets the "printing" state at the start of printing as the state information in the device information storage unit 404, and releases the "printing" state at the end of printing. Furthermore, the print execution unit 405 monitors the state of the print unit 207, and updates the state information in the device information storage unit 404 based on the state. If, for example, the remaining amount of a consumable such as ink toner or paper is equal to or smaller than a threshold, and is thus short, the print execution unit 405 updates the state information in the device information storage unit 404 to the "consumable remaining amount error" state.

The functional blocks in the management PC 102 will be described next. A device information acquisition unit 401, a device information display unit 402, and a management device editing unit 403 are functional blocks implemented by the CPU 300. A device management information database (DB) 400 is configured in the ROM 301 to store, as device management information, the device information acquired by the device information acquisition unit 401 from the image output apparatus 100. The device information display unit 402 displays the state concerning the image output apparatus as the management target on the display 309 based on the device management information stored in the device management information DB 400. The management device editing unit 403 edits/deletes, for each image output apparatus, the device management information stored in the device management information DB 400. For example, the management device editing unit 403 deletes, from the device management information DB 400, the device management information of the image output apparatus, which is instructed to be deleted.

FIG. 5 is a table showing an example of the device management information registered in the device management information DB 400 of the management PC 102. The device management information includes, as parameter types, a management ID 500, a device name 501, a connection destination 502, a MAC address 503, a product name 504, an installation place 505, a status 506, and a final status 507. The management device editing unit 403 can edit the device name 501 and the installation place 505 based on an instruction on the user interface screen in accordance with an operation status. The status information of the status 506 and the final status 507 is updated in accordance with the state of the image output apparatus 100, as will be described later with reference to FIG. 7.

The status 506 is registered in the device management information DB 400 when executing processing (to be described later with reference to FIG. 7) of acquiring the state information of the image output apparatus. In this case, if acquisition of the state information succeeds, contents of the state information are registered. Even if it is impossible to communicate with the image output apparatus and thus acquire the state information, information indicating "incommunicable" is registered in the status 506. On the other hand, if acquisition of the state information succeeds, contents of the acquired state information are registered in the final status 507. If the state information cannot be acquired, the final status 507 is not updated. Therefore, if acquisition of the state information succeeds, the same contents are stored in the status 506 and the final status 507. A more detailed description will be provided below.

For example, with respect to Printer-B, acquisition of the state information from the image output apparatus 100 succeeds, and the acquired state information indicates a normal operation and includes no warming or error contents. In this case, information indicating "normal" is stored in both the status 506 and the final status 507.

Alternatively, if contents indicated by the state information acquired from the image output apparatus 100 include warning or error contents, the warning or error contents are stored in the status 506 and the final status 507. For example, with respect to Printer-D, the state information acquired from the image output apparatus 100 indicates that the paper remaining amount is equal to or smaller than a threshold. In this case, information indicating "no paper" is stored in both the status 506 and the final status 507. For example, with respect to Printer-E, the state information acquired from the image output apparatus 100 indicates that the ink remaining amount is equal to or smaller than a threshold. In this case, information indicating "no ink" is stored in both the status 506 and the final status 507.

On the other hand, in this embodiment, if it is impossible to acquire the device information from the image output apparatus 100, information indicating "incommunicable" is stored in the status 506. In this case, the information indicating "incommunicable" is not stored in the final status 507, and contents of the final status 507 are maintained. For example, with respect to Printer-A, it is indicated that last acquisition of the state information succeeds and contents of the state information indicate "no ink" but the state information cannot be acquired although an attempt is made to acquire the state information. In this case, information indicating "incommunicable" is stored in the status 506. On the other hand, the final status 507 is not updated, and thus the information indicating "no ink" is maintained and stored as contents of the final status 507.

In this embodiment, as shown in FIG. 5, if the information indicating "incommunicable" is stored in the status 506, information indicating a state before it becomes impossible to communicate with the image output apparatus 100 is stored in the final status 507. Although described later with reference to FIG. 8, in this embodiment, it is possible to identifiably display, based on the information of the status 506 and the final status 507, image output apparatuses as deletion target candidates on a device management screen 600 for managing the image output apparatuses.

The device management information shown in FIG. 5 may be operated as different DBs for the respective parameter types, or a parameter type other than the above-described parameter types may be registered in the device management information DB 400.

FIG. 6 is a view showing an example of the device management screen 600 that is displayed on the display 309 of the management PC 102 by targeting the image output apparatus 100. In a device information list 601, a list of the pieces of device management information based on the pieces of device information acquired from the image output apparatuses as the management targets is displayed. The device information list 601 includes, as parameter types, a printer name 603, a connection destination 604, a status 605, a MAC address 606, a product name 607, and an installation place 608. The printer name 603 corresponds to the device name 501 of FIG. 5 and the connection destination 604 corresponds to the connection destination 502 of FIG. 5. The MAC address 606 corresponds to the MAC address 503 of FIG. 5, and the product name 607 corresponds to the product name 504 of FIG. 5. Furthermore, the installation place 608 corresponds to the installation place 505 of FIG. 5.

Upon the pressing of an update button 602, the device information acquisition unit 401 of the management PC 102 acquires the device information from each image output apparatus as the management target, and updates the device management information in the device management information DB 400. Then, the device information display unit 402 updates display of the device information list 601 based on the device management information. The status 605 corresponds to the status 506 of FIG. 5. Especially, if the status 506 and the final status 507 satisfy conditions, information indicating "non-management target" (that is, information indicating a deletion target candidate) is displayed.

As shown in FIG. 6, with respect to Printer-B to Printer-E, contents based on the pieces of device management information shown in FIG. 5 are displayed. On the other hand, with respect to Printer-A and Printer-F, "predicted as non-management target" is displayed in the status 605. In this embodiment, this arrangement allows the user to readily discover an image output apparatus as a deletion target candidate.

Figure 7:
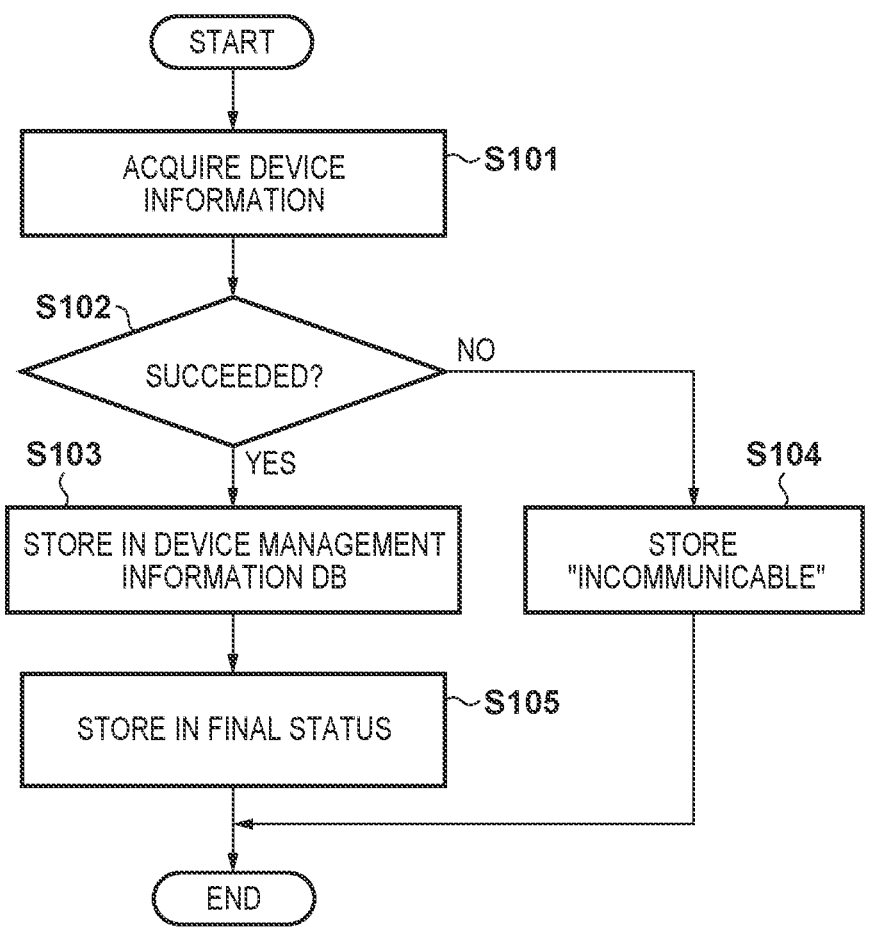
FIG. 7 is a flowchart illustrating processing of acquiring device information of the image output apparatus.

FIG. 7 is a flowchart illustrating processing of acquiring the device information of the image output apparatus 100, which is executed in the management PC 102. The processing shown in FIG. 7 is implemented when, for example, the CPU 300 reads out a program stored in the ROM 301 into the RAM 302 and executes it. The processing shown in FIG. 7 is executed at a periodic interval, for example, at predetermined time of the day.

In step S101, the CPU 300 causes the device information acquisition unit 401 to acquire the device information held in the device information storage unit 404 of the image output apparatus 100. In step S102, the CPU 300 determines whether acquisition of the device information held in the device information storage unit 404 of the image output apparatus 100 succeeds or fails. If it is determined that acquisition succeeds, the CPU 300 causes, in step S103, the device information acquisition unit 401 to store the device information acquired in step S101 in the device management information DB 400 as device management information. For example, each piece of information included in the acquired device information is stored in each corresponding item of the device name 501 to the installation place 505. In step S103, the CPU 300 stores, in the status 506 of the device management information DB 400, the state information included in the acquired device information.

In step S105, the CPU 300 causes the device information acquisition unit 401 to store, in the final status 507 of the device management information DB 400, the state information included in the device information acquired in step S101, and then ends the processing shown in FIG. 7. As described with reference to FIG. 5, when the device information includes a warning/error, if the warning/error is stored in the final status 507, information stored in the status 506 and that stored in the final status 507 may be the same or different.

On the other hand, if it is determined in step S102 that acquisition of the device information fails, the CPU 300 causes, in step S104, the device information acquisition unit 401 to store information indicating "incommunicable" in the status 506 of the device management information DB 400, and then ends the processing shown in FIG. 7. That is, in steps S101 and S102, a communication state with the image output apparatus 100 is determined by communication for newly acquiring the device information. Note that in step S104, the information indicating "incommunicable" is not stored in the final status 507.

Figure 8:
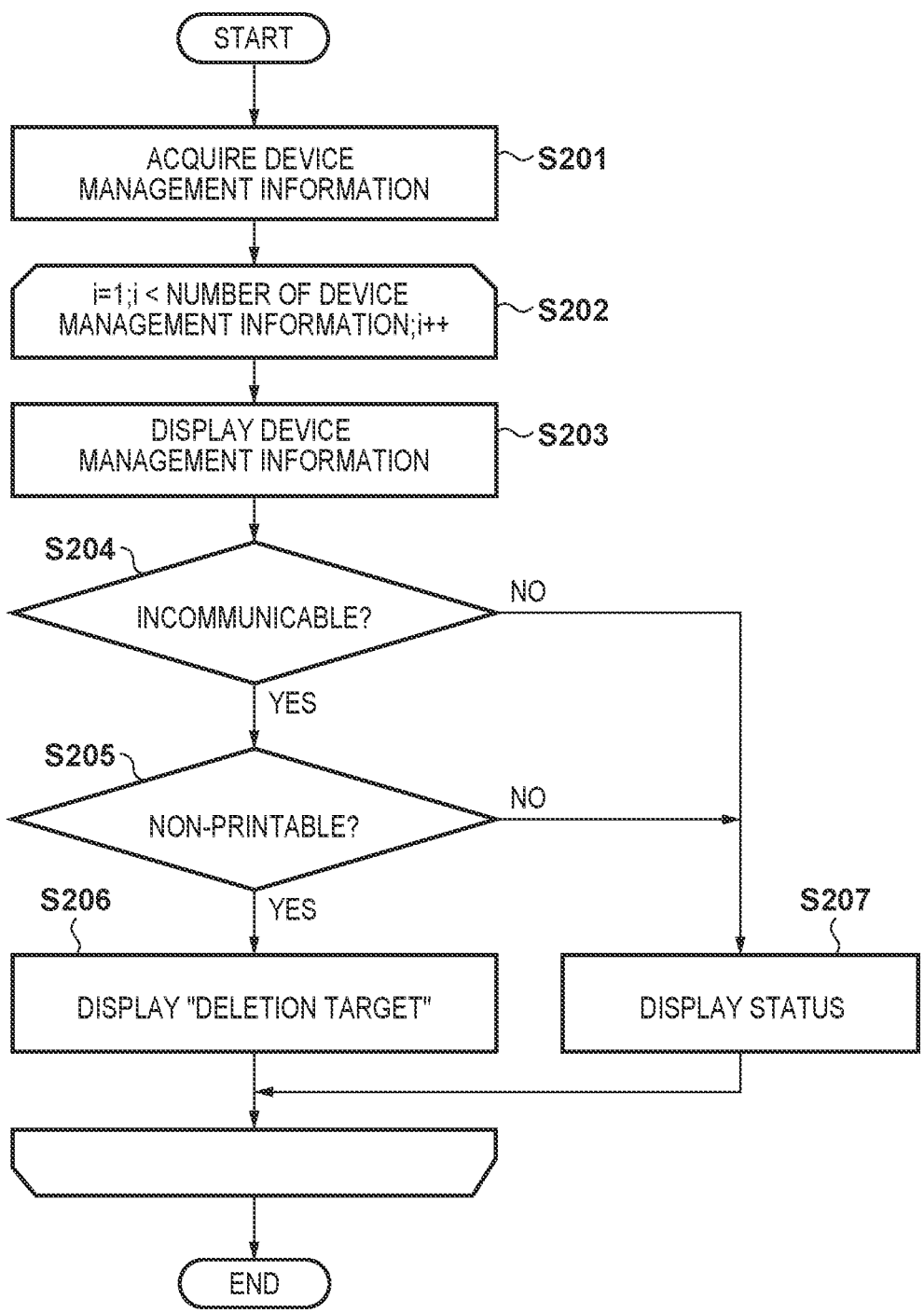
FIG. 8 is a flowchart illustrating processing of displaying the device management screen.

FIG. 8 is a flowchart illustrating processing of displaying the device management screen 600 by targeting the image output apparatus 100, which is executed in the management PC 102. The processing shown in FIG. 8 is implemented when, for example, the CPU 300 reads out a program stored in the ROM 301 into the RAM 302 and executes it. The processing shown in FIG. 8 starts when, for example, a display instruction of the device management screen 600 shown in FIG. 6 is accepted on the user interface screen.

In step S201, the CPU 300 causes the device information display unit 402 to acquire, for each image output apparatus, the device management information including the final status 507 stored in the device management information DB 400. In step S202, the CPU 300 ensures a variable i corresponding to the number of pieces of device management information for the following loop processing, and initializes the value of the variable i. The value of the variable i corresponds to the number of management IDs 500.

In step S203, the CPU 300 causes the device information display unit 402 to display the device name 501, the connection destination 502, the MAC address 503, the product name 504, and the installation place 505 on the device management screen 600. In step S204, the CPU 300 determines whether the status 506 is information indicating "incommunicable". If it is determined that the status 506 is not information indicating "incommunicable", the CPU 300 causes, in step S207, the device information display unit 402 to display the status 506 on the device management screen 600. After that, the CPU 300 increments the value of the variable i, and repeats the processing from step S203. If the processes in steps S203 to S207 are performed for all the pieces of device management information, the CPU 300 ends the loop processing, and then ends the processing shown in FIG. 8.

That is, if it is determined in step S204 that the status 506 is not information indicating "incommunicable", for example, if the image output apparatus 100 and the management PC 102 can communicate with each other, the state information of the image output apparatus 100 as the management target is displayed on the device management screen 600.

On the other hand, if it is determined in step S204 that the status 506 is information indicating "incommunicable", the CPU 300 determines whether the final status 507 is information indicating "non-printable". If it is determined that the final status 507 is not information indicating "non-printable", the CPU 300 causes, in step S207, the device information display unit 402 to display the status 506 on the device management screen 600. After that, the CPU 300 increments the value of the variable i, and repeats the processing from step S203. If the processes in steps S203 to S207 are performed for all the pieces of device management information, the CPU 300 ends the loop processing, and then ends the processing shown in FIG. 8.

That is, if it is determined in step S205 that the final status 507 is not information indicating "non-printable", for example, if communication between the image output apparatus 100 and the management PC 102 is temporarily disconnected but the image output apparatus 100 is in a printable state, the state information of the image output apparatus 100 as the management target is displayed on the device management screen 600.

On the other hand, if it is determined in step S205 that the final status 507 is information indicating "non-printable", the CPU 300 causes, in step S206, the device information display unit 402 to display information indicating "deletion target" in the status 605 of the device management screen 600. After that, the CPU 300 increments the value of the variable i, and repeats the processing from step S203. If the processes in steps S203 to S207 are performed for all the pieces of device management information, the CPU 300 ends the loop processing, and then ends the processing shown in FIG. 8.

That is, if it is determined in step S205 that the final status 507 is information indicating "non-printable", for example, if communication between the image output apparatus 100 and the management PC 102 is disconnected and the image output apparatus 100 is not in the printable state, the information indicating "deletion target" is displayed on the device management screen 600.

As described above, according to this embodiment, since an image output apparatus as a deletion target candidate is decided based on the fact that the image output apparatus is in the non-printable state, it is possible to decide an image output apparatus as a deletion target candidate more appropriately, as compared with an arrangement of making decision based on only a print frequency. Furthermore, since an image output apparatus as a deletion target candidate is decided based on the fact that the communication state of the image output apparatus is an incommunicable state with the management PC, if the user wants to shut down the image output apparatus due to a failure or the like and immediately delete the registration, the image output apparatus as the deletion target candidate can be decided quickly. That is, according to this embodiment, it is possible to appropriately notify, as a deletion target, the user of the image output apparatus that is considered not to be continuously used, thereby improving the user convenience of deletion processing.

Note that the above-described information indicating "non-printable" includes information indicating a state in which the remaining amount of a consumable such as feed paper or an ink tank necessary for print processing is zero or the consumable is detached, a failure state that cannot be recovered such as a service call or an operator call, or a state such as a transportation mode. Furthermore, if the image output apparatus 100 includes a plurality of paper feed ports, confirmation of a consumable may be performed for all the paper feed ports or for only a paper feed port to be used for printing.

Second Embodiment

Concerning the second embodiment, points different from the first embodiment will be described below. The first embodiment has explained a case in which, as shown in FIG. 6, the information indicating "deletion target" is displayed on the device management screen 600 together with information of another image forming apparatus as the management target. In the second embodiment, information of an image forming apparatus as a deletion target candidate is displayed to be identified more easily.

FIG. 9 is a view showing an example of a deletion target device display screen 700 according to this embodiment. As shown in FIG. 9, in the deletion target device display screen 700, the image output apparatus considered as the deletion target specified in steps S204 and S205 of FIG. 8 is grouped based on the installation place 505 and then displayed.

In the deletion target device display screen 700, for each image output apparatus 701, a check box 703 or 704 is displayed and can be selected by the user. If the user selects the check box and presses a deletion button 702, a CPU 300 causes a management device editing unit 403 to delete, from a device management information DB 400, device management information concerning the selected image output apparatus.

As described above, according to this embodiment, the user can confirm an image output apparatus as a deletion target candidate more easily for each base in which the image output apparatus is installed. This effect becomes more conspicuous as the number of image output apparatuses or the number of bases in which the image output apparatuses are installed is larger.

FIG. 9 shows an example in which the image output apparatus is grouped based on the installation place 505. However, the criterion for grouping may be another parameter type such as a product name 504 instead of the installation place 505. Furthermore, other information obtained from a parameter type may be used. For example, floor information obtained from a MAC address 503 and the installation place 505 may be used. After the processing of FIG. 8, the screen shown in FIG. 9 may be displayed without intervention of a device management screen 600 shown in FIG. 6 or may be displayed via the pressing of an instruction button (not shown) on the device management screen 600.

Third Embodiment

Concerning the third embodiment, points different from the first and second embodiments will be described below. The third embodiment assumes an operation in which an image output apparatus as the management target is replaced by another apparatus of the same model. In this case, an operation executed in a management PC 102 for the image output apparatus as the management target includes the following two operations.

adding the image output apparatus of the replacement destination to the management target deleting the image output apparatus of the replacement source from the management target In this embodiment, at the stage of the above addition operation, it is possible to readily identify, as a deletion target candidate, the image output apparatus of the replacement source from the group of image output apparatuses as the management targets. This arrangement allows the user to readily perform the deletion operation together with the addition operation, thereby improving the operation efficiency.

Figure 10:
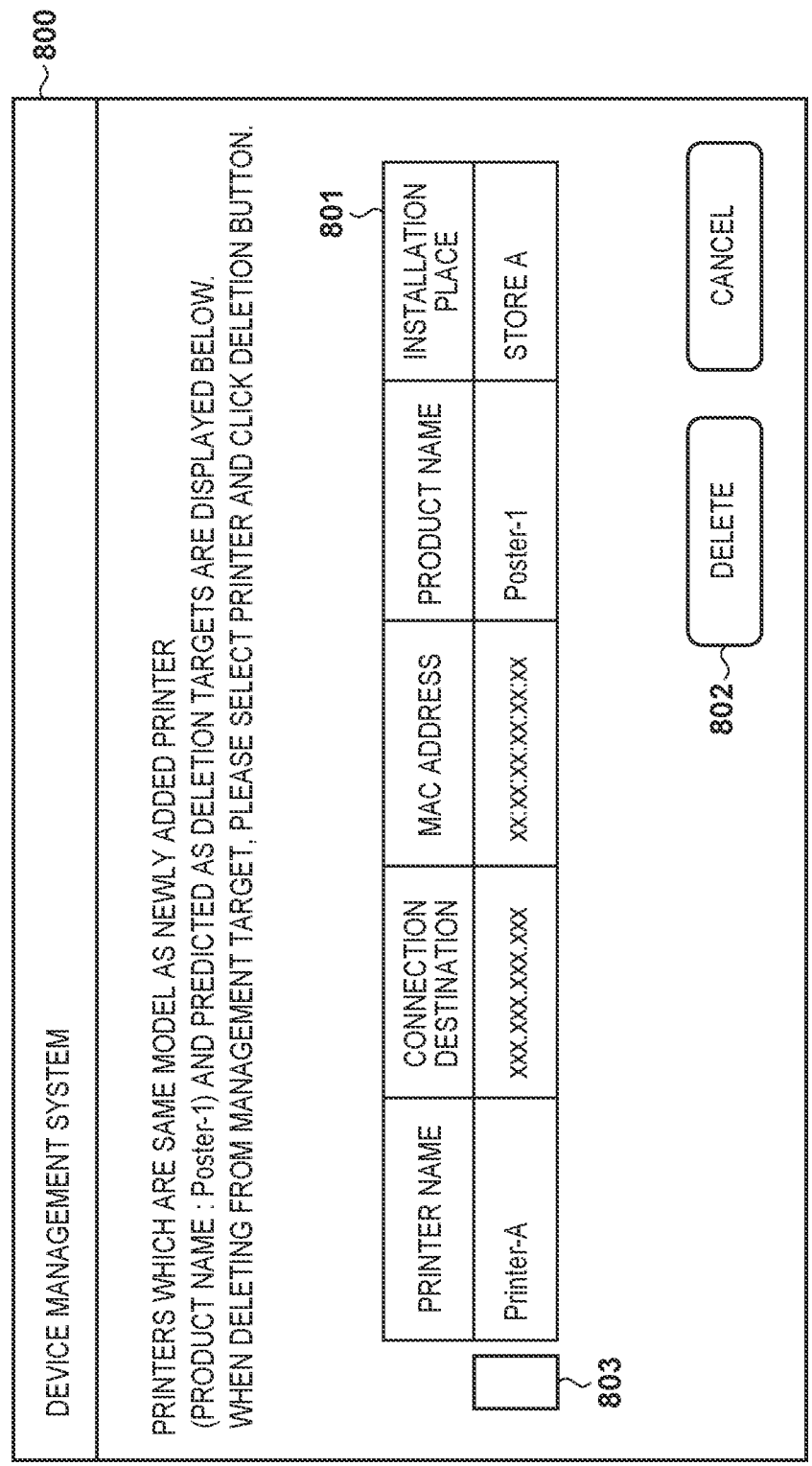
FIG. 10 is a view showing a replacement processing execution screen.

FIG. 10 is a view showing an example of a replacement processing execution screen 800 displayed on a display 309 of the management PC 102 by targeting an image output apparatus 100. In a deletion target device list 801 of replacement sources, a list of pieces of device information acquired from image output apparatuses as deletion target candidates specified as replacement sources is displayed. In the deletion target device list 801 of the replacement sources, a check box 803 is displayed for each image output apparatus, and can be selected by the user. If the user selects the check box and presses a deletion button 802, a CPU 300 causes a management device editing unit 403 to delete, from a device management information DB 400, device management information concerning the selected image output apparatus.

Figure 11:
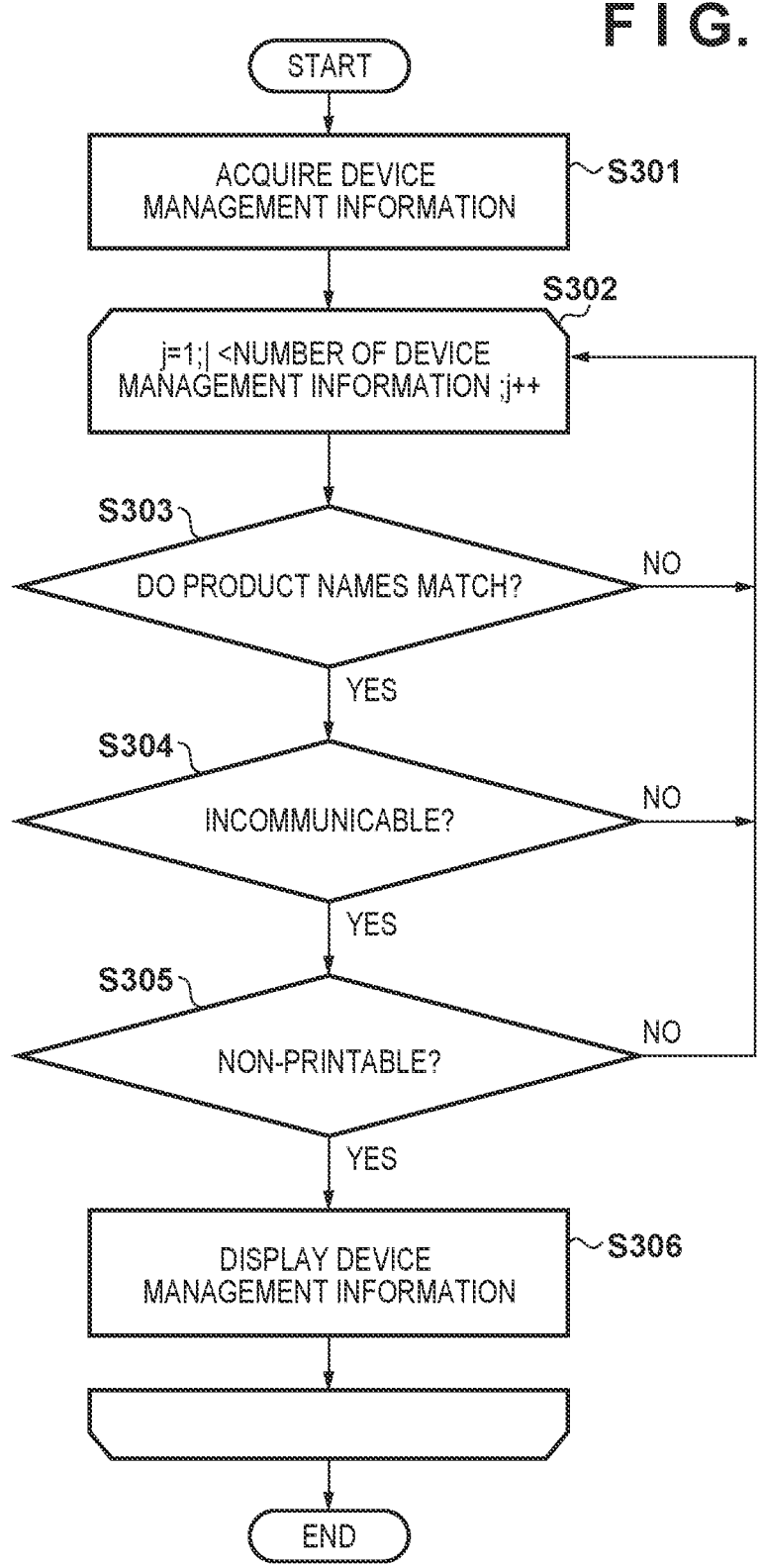
FIG. 11 is a flowchart illustrating processing of displaying the replacement processing execution screen.

FIG. 11 is a flowchart illustrating processing of displaying the replacement processing execution screen 800 when the image output apparatus 100 is added as the management target, which is executed in the management PC 102. The processing shown in FIG. 11 is implemented when, for example, the CPU 30) reads out a program stored in a ROM 301 into a RAM 302 and executes it. The processing shown in FIG. 11 starts when, for example, an instruction to display the replacement processing execution screen 800 is accepted on a user interface screen.

In step S301, the CPU 300 causes a device information display unit 402 to acquire, for each image output apparatus, device management information including a final status 507 stored in the device management information DB 400. In step S302, the CPU 300 ensures a variable j corresponding to the number of pieces of device management information for the following loop processing, and initializes the value of the variable j. The value of the variable j corresponds to the number of management IDs 500.

In step S303, the CPU 300 determines whether a product name 504 included in the device management information matches the product name of the image output apparatus added as the management target. If it is determined in step S303 that the product names do not match each other, the CPU 300 increments the value of the variable j, and repeats the processing from step S303. If the processes in steps S303 to S306 are performed for all the pieces of device management information, the CPU 300 ends the loop processing, and then ends the processing shown in FIG. 11.

If it is determined in step S303 that the product names match each other, the CPU 300 determines in step S304 whether a status 506 is information indicating "incommunicable". If it is determined that the status 506 is not information indicating "incommunicable", the CPU 300 increments the value of the variable j, and repeats the processing from step S303. If the processes in steps S303 to S306 are performed for all the pieces of device management information, the CPU 300 ends the loop processing, and then ends the processing shown in FIG. 11.

If it is determined in step S304 that the status 506 is information indicating "incommunicable", the CPU 300 determines in step S305 whether the final status 507 is information indicating "non-printable". If it is determined that the final status 507 is not information indicating "non-printable", the CPU 300 increments the value of the variable j, and repeats the processing from step S303. If the processes in steps S303 to S306 are performed for all the pieces of device management information, the CPU 300 ends the loop processing, and then ends the processing shown in FIG. 11.

If it is determined in step S305 that the final status 507 is information indicating "non-printable", the CPU 300 causes the device information display unit 402 to display a device name 501, a connection destination 502, a MAC address 503, the product name 504, and an installation place 505 on the replacement processing execution screen 800. After that, the CPU 300 increments the value of the variable j, and repeats the processing from step S303. If the processes in steps S303 to S306 are performed for all the pieces of device management information, the CPU 300 ends the loop processing, and then ends the processing shown in FIG. 11.

This embodiment has exemplified replacement to an apparatus of the same model whose product name 504 matches in step S303. However, another method may be adopted. For example, the management PC 102 may pre-register the models of the replacement source and the replacement destination, and use information of the replacement source by setting, as a determination criterion in step S303, information such as the connection destination 502, the MAC address 503, the installation place 505, the status 506, or a manufacturer name included in the device information. With this arrangement, for example, the operation of this embodiment is also applicable to a case of replacement to an apparatus of a next-generation model or another manufacturer. When a consumable of the image output apparatus 100 is not attached, if the consumable that was attached to the image output apparatus 100 is the same as that attached to the image output apparatus added to the management target, the image output apparatus 100 which is not attached with the consumable may be determined as a replacement source. At this time, for example, whether the model number of the consumable is the same may be used as a determination criterion.

Furthermore, the deletion target device list 801 of the replacement sources shown in FIG. 10 may be grouped for each parameter type such as the product name 504 or the installation place 505 included in the device management information and then displayed, as shown in FIG. 9. With this arrangement, even if the number of image output apparatuses or the number of bases in which the image output apparatuses are installed is large when the user adds an image output apparatus, the user can readily identify the image output apparatus of the replacement source as a deletion target candidate.

Fourth Embodiment

Concerning the fourth embodiment, points different from the first to third embodiments will be described below. It is determined in steps S204 and S205 of FIG. 8 and steps S304 and S305 of FIG. 11 whether it is impossible to communicate with the image output apparatus 100 and whether the final status 507 is information indicating "non-printable". In step S303 of FIG. 11, it is determined whether the product name matches that of the added image output apparatus. In this embodiment, a determination condition of an image output apparatus as a deletion target candidate can be designated arbitrarily.

FIG. 12 is a table showing an example of definition information for defining a condition for determining a deletion target. As shown in FIG. 12, the definition information includes a condition ID 900, an item 901 of device management information, and contents 902 of the device management information. For example, the definition information shown in FIG. 12 can be edited on a user interface screen by the user, and the edited definition information is stored in a storage area such as a ROM 301.

In the definition information, the condition ID 900 is identification information for identifying each condition. The item 901 of the device management information indicates an item (parameter type) of the device management information for determining a deletion target. The contents 902 of the device management information represent contents of the item 901 of the device management information. For example, definition information identified by ID-a indicates that a condition for determining a deletion target is that contents of a product name 504 are "Poster-1". The definition information shown in FIG. 12 may be operated by a separated file for each parameter type or a parameter type other than the above-described parameter types may be included in the definition information.

Figure 13:
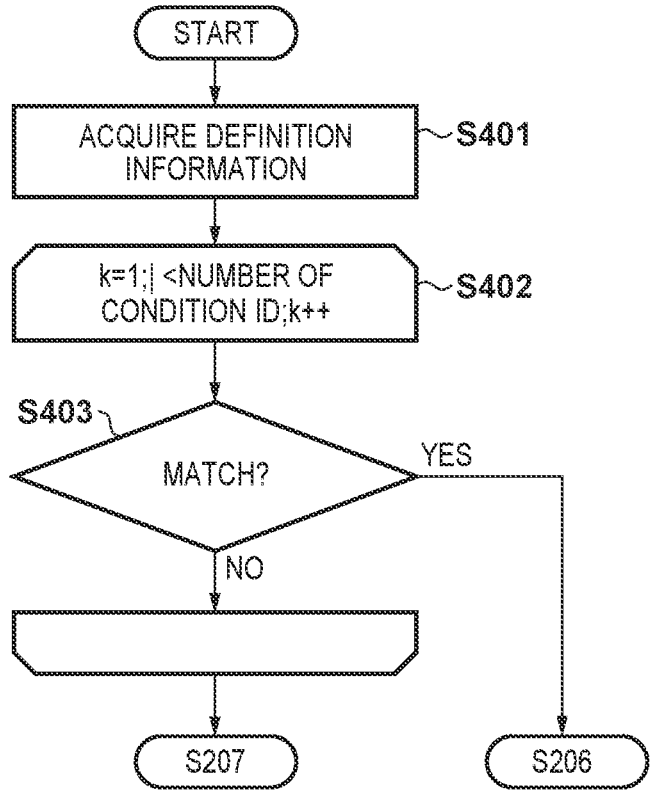
FIG. 13 is a flowchart illustrating processing of displaying a device management screen.

FIG. 13 is a flowchart illustrating processing of displaying a device management screen 600 by targeting an image output apparatus 100, which is executed in a management PC 102, according to this embodiment. The processing shown in FIG. 13 is implemented when, for example, the CPU 300 reads out a program stored in the ROM 301 into a RAM 302 and executes it. The processing shown in FIG. 13 is executed at the succeeding stage of step S205 of FIG. 8.

In step S401, the CPU 300 causes a device information acquisition unit 401 to acquire the definition information shown in FIG. 12. In step S402, the CPU 300 ensures, for the following loop processing, a variable k corresponding to the number of determination conditions included in the definition information, and initializes the value of the variable k. The value of the variable k corresponds to the number of condition IDs 900.

In step S403, the CPU 300 determines whether the contents 902 of the device management information match with respect to the item 901 of the device management information. If it is determined that the contents do not match, the CPU 300 increments the value of the variable k, and repeats the processing from step S402. If the processing in step S403 is performed for all the condition IDs, the CPU 300 ends the loop processing, ends the processing shown in FIG. 11, and performs the processing in step S206 or S207 of FIG. 8 based on the determination result in step S403. If, for example, it is determined in step S403 that the contents match, the CPU 300 ends the processing shown in FIG. 11, and performs the processing in step S206 of FIG. 8.

That is, in the processing shown in FIG. 13, if it is determined in step S403 that contents match with respect to any of the condition IDs 900 included in the definition information, the image output apparatus 100 is determined as the deletion target. If it is determined that contents match with respect to a plurality of condition IDs 900 included in the definition information or all the condition IDs 900, the image output apparatus 100 may be determined as the deletion target. Alternatively, the user may be allowed to designate a condition ID to be used to determine the image output apparatus 100 as the deletion target among the plurality of condition IDs included in the definition information.

As described above, according to this embodiment, an arbitrary determination condition can be added to the determination conditions of whether it is impossible to communicate with the image output apparatus 100 and whether the final status 507 is information indicating "non-printable". For example, if the management PC 102 manages an enormous number of image output apparatuses, the image output apparatuses specified in step S205 of FIG. 8 can further be narrowed based on a specific base or store. The processing shown in FIG. 13 has been explained as processing executed at the succeeding stage of step S203 of FIG. 8 but may be executed at the succeeding stage of step S305 of FIG. 11.

Fifth Embodiment

Concerning the fifth embodiment, points different from the first to fourth embodiments will be described below. If it is determined in steps S204 and S205 of FIG. 8 that the status 506 is information indicating "incommunicable" and the final status 507 is information indicating "non-printable", the image output apparatus 100 is determined as the deletion target. If transportation of the image output apparatus is performed for movement to another base or the like, for example, ink suction of cleaning or the like is performed for the image output apparatus 100 and then the image output apparatus 100 may be shut down. Even when a trouble caused by a failure cannot be solved easily by the user like supply of a consumable or elimination of a paper jam, the image output apparatus may be shut down immediately. That is, only if a use case corresponds to the above case, it may be desirable to determine the image output apparatus 100 as the deletion target.

Figure 14:
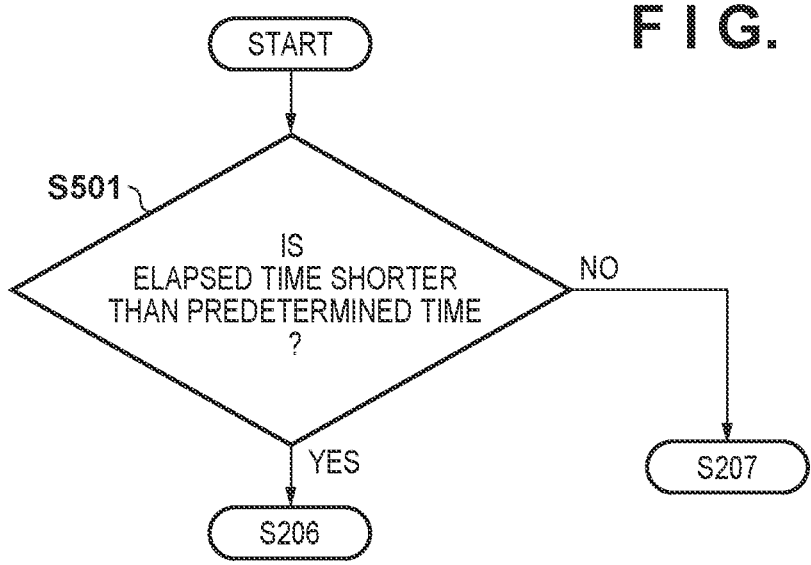
FIG. 14 is a flowchart illustrating determination processing with respect to a final status.

In this embodiment, in the case described above, processing shown in FIG. 14 is executed after steps S204 and S205 of FIG. 8. That is, if it is determined in step S205 that a final status 507 is information indicating "non-printable", a CPU 300 determines in step S501 whether an elapsed time after the final status 507 becomes information indicating "non-printable" is shorter than a predetermined time. If it is determined in step S501 that the elapsed time is shorter than the predetermined time, the processing in step S206 of FIG. 8 is performed; otherwise, the processing in step S207 of FIG. 8 is performed. Note that whether it is possible to execute the processing shown in FIG. 14 may be designated on a user interface screen. For example, in the above-described use case, the operation of this embodiment is implemented by accepting an execution instruction of the processing shown in FIG. 14 from the user.

As described above, according to this embodiment, the user can change the determination processing with respect to the final status 507 in accordance with the use case.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-064197, filed Mar. 31, 2020, which is hereby incorporated by reference herein in its entirety.

What is claimed is:

1. An information processing apparatus communicable with an image output apparatus, comprising:
one or more memories storing instructions; and
one or more processors configured to, upon executing stored instructions, function as:
a storage unit configured to store first status information concerning whether it is possible to execute a function in the image output apparatus, which is acquired from the image output apparatus; and
a display unit configured to display a list of image output apparatuses as management targets based on the first status information stored in the storage unit and second status information concerning a communication state between the information processing apparatus and the image output apparatus,
wherein if a condition based on the first status information and the second status information is satisfied, the display unit displays, as a candidate to be deleted from the management targets, an image output apparatus corresponding to the first status information and the second status information, and wherein the condition includes, as a condition concerning the second status information, a condition that communication between the information processing apparatus and the image output apparatus is impossible.

2. The apparatus according to claim 1, wherein the condition includes, as a condition concerning the first status information, a state in which it is impossible to execute a print function in the image output apparatus.

3. The apparatus according to claim 2, wherein the state in which it is impossible to execute the print function includes at least one of a shortage of a consumable and a failure of a print unit.

4. The apparatus according to claim 2, wherein the one or more processors are further configured to function as an acquisition unit configured to acquire the first status information from the image output apparatus, wherein the state in which it is impossible to execute the print function in the image output apparatus indicates a state of the image output apparatus when the acquisition unit acquires the first status information before communication between the information processing apparatus and the image output apparatus becomes impossible.

5. The apparatus according to claim 2, wherein the condition includes, as the condition concerning the first status information, a condition based on a predetermined elapsed time after it becomes impossible to execute the print function in the image output apparatus.

6. The apparatus according to claim 1, wherein if a condition concerning a first image output apparatus whose first status information is stored in the storage unit and a second image output apparatus added to the management targets is satisfied, the display unit displays the image output apparatus corresponding to the first status information as the candidate to be deleted.

7. The apparatus according to claim 6, wherein the condition concerning the first image output apparatus and the second image output apparatus is that device information acquired from the first image output apparatus and managed by the information processing apparatus matches device information of the second image output apparatus.

8. The apparatus according to claim 7, wherein the device information is a product name of the image output apparatus.

9. The apparatus according to claim 6, wherein the one or more processors are further configured to function as a setting unit configured to set the condition concerning the first image output apparatus and the second image output apparatus.

10. The apparatus according to claim 1, wherein the display unit groups and displays the plurality of image output apparatuses as the candidates to be deleted, based on pieces of device information of the plurality of image output apparatuses.

11. The apparatus according to claim 10, wherein the display unit groups and displays the plurality of image output apparatuses as the candidates to be deleted, based on pieces of information concerning installation places of the plurality of image output apparatuses.

12. The apparatus according to claim 1, wherein the one or more processors are further configured to function as:

an acceptance unit configured to accept an instruction to delete the image output apparatus as the candidate to be deleted; and a deletion unit configured to delete, upon accepting the instruction by the acceptance unit, from the storage unit, management information for managing the image output apparatus as the candidate to be deleted.

13. The apparatus according to claim 1, wherein the one or more processors are further configured to function as a determination unit configured to determine the communication state based on communication for newly acquiring the first status information when the first status information is stored in the storage unit, wherein the condition is a condition based on the first status information stored in the storage unit and the communication state determined by the determination unit.

14. An information processing method executed by an information processing apparatus communicable with an image output apparatus, comprising:

storing first status information concerning whether it is possible to execute a function in the image output apparatus, which is acquired from the image output apparatus; and displaying a list of image output apparatuses as management targets based on the stored first status information and second status information concerning a communication state between the information processing apparatus and the image output apparatus, wherein in the displaying, if a condition based on the first status information and the second status information is satisfied, an image output apparatus corresponding to the first status information and the second status information is displayed as a candidate to be deleted from the management targets, and wherein the condition includes, as a condition concerning the second status information, a condition that communication between the information processing apparatus and the image output apparatus is impossible.

15. A non-transitory computer-readable storage medium storing a program for causing a computer to function to:

store first status information concerning whether it is possible to execute a function in an image output apparatus, which is acquired from the image output apparatus; and display a list of image output apparatuses as management targets based on the stored first status information and second status information concerning a communication state between an information processing apparatus and the image output apparatus, wherein in the displaying, if a condition based on the first status information and the second status information is satisfied, an image output apparatus corresponding to the first status information and the second status information is displayed as a candidate to be deleted from the management targets, and wherein the condition includes, as a condition concerning the second status information, a condition that communication between the information processing apparatus and the image output apparatus is impossible.

* * * * *